(12) United States Patent
Van der Sanden et al.

(10) Patent No.: US 10,696,027 B2
(45) Date of Patent: Jun. 30, 2020

(54) MULTILAYER FILMS AND METHODS OF MAKING THE SAME

(71) Applicant: ExxonMobil Chemical Patents Inc., Baytown, TX (US)

(72) Inventors: Dirk G. F. Van der Sanden, Keerbergen (BE); Mario Bastiaens, Haacht (BE); Achiel J. M. Van Loon, Antwerp (BE); Etienne R. H. Lernoux, Longueville (BE); Marc Tierens, Meise (BE)

(73) Assignee: ExxonMobil Chemical Patents, Inc., Baytown, TX (US)

( * ) Notice: Subject to any disclaimer, the term of this patent is extended or adjusted under 35 U.S.C. 154(b) by 60 days.

(21) Appl. No.: 16/065,647

(22) PCT Filed: Jan. 17, 2017

(86) PCT No.: PCT/US2017/013735
§ 371 (c)(1),
(2) Date: Jun. 22, 2018

(87) PCT Pub. No.: WO2017/155609
PCT Pub. Date: Sep. 14, 2017

(65) Prior Publication Data
US 2019/0001639 A1 Jan. 3, 2019

Related U.S. Application Data

(60) Provisional application No. 62/306,930, filed on Mar. 11, 2016.

(51) Int. Cl.
*B32B 7/02* (2019.01)
*B32B 27/08* (2006.01)
*B32B 27/32* (2006.01)

(52) U.S. Cl.
CPC .............. *B32B 27/08* (2013.01); *B32B 7/02* (2013.01); *B32B 27/32* (2013.01); *B32B 2250/05* (2013.01); *B32B 2250/242* (2013.01); *B32B 2270/00* (2013.01); *B32B 2307/30* (2013.01); *B32B 2307/406* (2013.01); *B32B 2307/544* (2013.01); *B32B 2307/546* (2013.01); *B32B 2307/558* (2013.01); *B32B 2307/5825* (2013.01); *B32B 2307/72* (2013.01); *B32B 2307/732* (2013.01); *B32B 2439/00* (2013.01); *B32B 2553/00* (2013.01)

(58) Field of Classification Search
CPC .......... B32B 2250/05; B32B 2250/242; B32B 2270/00; B32B 2307/30; B32B 2307/406; B32B 2307/544; B32B 2307/546; B32B 2307/558; B32B 2307/5825; B32B 2307/72; B32B 2307/732; B32B 2439/00; B32B 2553/00; B32B 27/08; B32B 27/32; B32B 7/02

See application file for complete search history.

(56) References Cited

U.S. PATENT DOCUMENTS

| | | | |
|---|---|---|---|
| 6,956,088 B2 | 10/2005 | Farley et al. | |
| 8,586,676 B2 | 11/2013 | Van Loon et al. | |
| 2006/0188678 A1* | 8/2006 | Ohlsson | B32B 7/02 428/35.7 |
| 2012/0100356 A1 | 4/2012 | Ohlsson et al. | |

FOREIGN PATENT DOCUMENTS

| | | |
|---|---|---|
| EP | 2141016 A | 1/2010 |
| WO | 2009/109367 | 9/2009 |
| WO | 2010/046098 A | 4/2010 |
| WO | 2012/003042 A | 1/2012 |
| WO | 2014/088827 A | 6/2014 |

* cited by examiner

*Primary Examiner* — Lawrence D Ferguson
(74) *Attorney, Agent, or Firm* — ExxonMobil Chemical Patents, Inc.—Law Department

(57) ABSTRACT

Disclosed are multilayer films which can provide desired film performance and balanced overall performance suited for various applications.

24 Claims, No Drawings

MULTILAYER FILMS AND METHODS OF MAKING THE SAME

CROSS REFERENCE TO RELATED APPLICATIONS

This application is a National Phase Application International Application No. PCT/US2017/013735, filed Jan. 17, 2017, which claims the benefit of Ser. No. 62/306,930, filed on Mar. 11, 2016, which is herein incorporated by reference in its entirety.

FIELD OF THE INVENTION

This invention relates to films, and in particular, to multilayer films comprising polyethylene and methods for making such films.

BACKGROUND OF THE INVENTION

Coextruded blown films are widely used in a variety of packaging as well as other applications. Film properties are often subject to the combined effect of the coextrusion process conditions and polymer compositions selected for the different layers. In order to address requirements of particular end-uses, film producers have to accordingly highlight certain film properties while balancing different mechanical properties such as stiffness and toughness to make stronger films for a given thickness and optical properties such as clarity and haze which impact the attractiveness of the packaging and visual inspection of the goods at the point of sale. A three-layer structure has been conventionally employed and refined over time in the art by different applications, in which at least one surface or outer layer is made to facilitate heat-sealing and a core layer may be used to provide strength, impact resistance, stretchability, other main physical properties of the film, or combinations thereof.

Among all polymers used for coextruded blown films, ethylene polymers, such as low density polyethylene (LDPE), linear low density polyethylene (LLDPE) prepared by Ziegler-Natta catalyst in a gas phase process, and blends thereof, have been popular in the market because they can provide relatively low-cost solutions. Such materials, while offering advantages in clarity, often have negative effects on film mechanical properties for a number of applications. Efforts to remedy the situation include introducing and increasing metallocene polyethylenes (mPEs) in the films, which are also known to have extended versatilities and down-gauging potential of the three-layer coextruded blown films. However, addition of higher amounts of mPE into the three-layer films with reduced use of LDPE, while providing improved mechanical performance such as stiffness, may likewise lead to undesirable optical properties, such as a higher haze and a lower clarity. Generally, previous attempts in the art mostly focus on point-by-point improvements on the current three-layer structure, thus balance between different properties, flexibility in modification, and further potential of down-gauging all continue to be restricted by varying film formulation with the available selection of ethylene polymers. It is viewed as a difficulty by film manufacturers of various applications to develop a convenient and flexible approach to enable selective improvement on a certain set of properties per favored by end-use while maintaining a well-balanced overall film performance without significantly increasing polyethylene consumption under cost pressure.

WO 2014/088827 provides polyethylene compositions comprising one or more ethylene polymers and one or more HDPE modifiers, in particular, this application further relates to polyethylene blends comprising one or more ethylene polymers and one or more HDPE modifiers, wherein the modifier has: 1) a density of greater than 0.94 g/cc; 2) a $M_w/M_n$ greater than 5; 3) a melt index (ASTM 1238, 190° C., 2.16 kg) of less than 0.7 dg/min; and 4) a $g^+_{vis}$ of 0.96 or less.

U.S. Patent Publication No. 2012/0100356 relates to a multi-layer blown film with improved strength or toughness comprising a layer comprising a metallocene polyethylene (mPE) having a high melt index ratio (MIR), a layer comprising an mPE having a low MIR, and a layer comprising a HDPE, and/or LDPE. Other embodiments have skin layers and a plurality of sub-layers. At least one sub-layer includes an mPE, and at least one additional sub-layer includes HDPE and/or LDPE. The mPE has a density from about 0.910 to about 0.945 g/cm$^3$, MI from about 0.1 to about 15 g/10 min, and melt index ratio (MIR) from about 15 to 25 (low-MIR mPE) and/or from greater than 25 to about 80 (high-MIR mPE). The process is related to supplying respective melt streams for coextrusion at a multi-layer die to form a blown film having the inner and outer skin layers and a plurality of sub-layers, wherein the skin layers and at least one of the sub-layers comprise mPE and at least one of the sub-layers comprise HDPE, LDPE or both. Draw-down, blow-up ratios and freeze-line distance from the die are controlled to facilitate a high production rate.

U.S. Pat. No. 8,586,676 provides a polymer composition and articles made therefrom. The composition includes: (a) a polyethylene having (i) at least 50 wt % ethylene moieties; and (ii) up to 50 wt % of a $C_3$ to $C_{20}$ comonomer moieties, a density of about 0.860 to about 0.965 g/cm$^3$, a melt index of about 0.1 to about 10.0 g/10 min and a branching index of about 0.96 to about 1.0; and (b) a polyethylene having: (i) at least 65 wt % ethylene moieties; and (ii) up to 35 wt % of a $C_3$ to $C_{20}$ comonomer moieties, wherein the wt % is based upon the total weight of the latter polyethylene, a density of about 0.905 to about 0.945 g/cm$^3$, a melt index (MI) of about 0.1 to about 10.0 g/10 min, and a branching index (g') of about 0.7 to about 0.95.

WO 2009/109367 discloses the use linear polyethylene having an MIR indicative of the presence of some long chain branching having a density of 0.91 to 0.94 g/cm$^3$ determined according to ASTM D4703/D1505, an $I_{2.16}$ (MI) of from 0.05 to 1 g/10 min, and $I_{21.6}/I_{2.16}$ (MIR) of more than 35, the MI and MIR being determined according to ASTM 1238 D at 190° C., and a difference between the MD Tensile force based on ASTM D882-02 at 100% elongation and MD 10% offset yield of a reference film as defined herein having a thickness of 25 μm of at least 15 MPa. This patent application also relates to coextruded film structures made using such linear polyethylene in the core layer of a multi-layer structure to provide easily processable, strong, highly transparent films.

U.S. Pat. No. 6,956,088 relates to films that exhibit an improved balance of physical properties, and a metallocene catalyzed polyethylene used to make the films that is easier to process than previous metallocene catalyst produced polyolefins and/or polyethylenes. The films are produced with polyethylenes having a relatively broad composition distribution (CD) and a relatively broad molecular weight distribution (MWD).

That said, there remains an industry wide need to explore a solution that can deliver advantages over the current three-layer structure technology of expanded selection of options to more efficiently improve application-oriented properties without substantially compromising other properties, preferably with gauge reduction. Applicant has found that such objective can be achieved by a film structure of at least five layers as long as certain density relationships between layers are met. While the polyethylenes used remain unchanged, compared to the conventional three-layer structure, such increase in the number of layers can facilitate selective improvement on desired properties and fine-tuning of property profile by conveniently adjusting layer distribution and density relationship between layers, particularly modifying relationship between other layers and the most "stiff" layer, i.e. the one containing the polyethylene having the highest density of all polyethylenes in the film, preferably the inner layer between the core layer and the outer layer. In step with the above is an improved balance between repulsive mechanical properties, e.g., stiffness-related and toughness related properties, as well as between mechanical and optical properties, which results in enhanced overall film performance allowing for a gauge reduction of at least about 10%, depending on specific property profile. Therefore, the inventive film offers a promising alternative to the conventional three-layer structure for future development in the coextruded blown film industry.

SUMMARY OF THE INVENTION

Provided are multilayer films and methods for making such films.

In one embodiment, the present invention encompasses a multilayer film, comprising two outer layers, a core layer between the two outer layers, and two inner layers each between the core layer and each outer layer, wherein at least one of the inner layers has a density within about 0.065 g/cm$^3$ higher than or equal to that of the core layer, and about 0.015 to about 0.065 g/cm$^3$ higher than that of the outer layer on the same side of the core layer; wherein the core layer has a density no lower than that of each of the outer layers.

In another embodiment, the present invention relates to a method for making a multilayer film, comprising the steps of: (a) preparing two outer layers, a core layer between the two outer layers, and two inner layers each between the core layer and each outer layer, wherein at least one of the inner layers has a density within about 0.065 g/cm$^3$ higher than or equal to that of the core layer, and about 0.015 to about 0.065 g/cm$^3$ higher than that of the outer layer on the same side of the core layer; wherein the core layer has a density no lower than that of each of the outer layers; and (b) forming a multilayer film comprising the layers in step (a).

The multilayer film described herein or made according to any method disclosed herein has at least one of the following properties: (i) a bending stiffness factor of at most about 50% higher; (ii) a tear resistance of at most about 15% higher in the Machine Direction (MD); and (iii) a dart impact of at most about 40% higher; compared to that of a three-layer film having two outer layers and a core layer between the two outer layers, the same total thickness as that of the multilayer film, the same composition of each of the two outer layers as that of the multilayer film, maximum thickness of the core layer equal to total thickness of the two inner layers and the core layer of the multilayer film, and maximum density of the core layer equal to compound density of the two inner layers and the core layer of the multilayer film.

Preferably, the core layer comprises a first polyethylene derived from ethylene and one or more $C_3$ to $C_{20}$ α-olefin comonomers, wherein the first polyethylene has a density of from about 0.900 to about 0.945 g/cm$^3$, a melt index (MI), $I_{2.16}$, of from about 0.1 to about 15 g/10 min, a molecular weight distribution (MWD) of from about 1.5 to about 5.5, and a melt index ratio (MIR), $I_{21.6}/I_{2.16}$, of from about 10 to about 100. Preferably, at least one of the inner layers comprises a second polyethylene having a density of at least about 0.940 g/cm$^3$. Preferably, at least one of the outer layers comprises a third polyethylene derived from ethylene and one or more $C_3$ to $C_{20}$ α-olefin comonomers, wherein the first polyethylene has a density of about 0.900 to about 0.945 g/cm$^3$, a melt index (MI), $I_{2.16}$, of about 0.1 to about 15 g/10 min, a molecular weight distribution (MWD) of about 1.5 to about 5.5, and a melt index ratio (MIR), $I_{21.6}/I_{2.16}$, of about 10 to about 100.

DETAILED DESCRIPTION OF THE PRESENT INVENTION

Various specific embodiments, versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the present inventions defined by the claims. The use of headings is for purposes of convenience only and does not limit the scope of the present invention.

As used herein, a "polymer" may be used to refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene," "ethylene polymer," "ethylene copolymer," and "ethylene based polymer" mean a polymer or copolymer comprising at least 50 mol % ethylene units (preferably at least 70 mol % ethylene units, more preferably at least 80 mol % ethylene units, even more preferably at least 90 mol % ethylene units, even more preferably at least 95 mol % ethylene units or 100 mol % ethylene units (in the case of a homopolymer)). Furthermore, the term "polyethylene composition" means a composition containing one or more polyethylene components.

As used herein, when a polymer is referred to as comprising a monomer, the monomer is present in the polymer in the polymerized form of the monomer or in the derivative form of the monomer.

As used herein, when a polymer is said to comprise a certain percentage, wt %, of a monomer, that percentage of monomer is based on the total amount of monomer units in the polymer.

For purposes of this invention and the claims thereto, an ethylene polymer having a density of 0.910 to 0.940 g/cm$^3$ is referred to as a "low density polyethylene" (LDPE); an ethylene polymer having a density of 0.890 to 0.940 g/cm$^3$, typically from 0.915 to 0.930 g/cm$^3$, that is linear and does not contain a substantial amount of long-chain branching is referred to as "linear low density polyethylene" (LLDPE) and can be produced with conventional Ziegler-Natta catalysts, vanadium catalysts, or with metallocene catalysts in gas phase reactors, high pressure tubular reactors, and/or in slurry reactors and/or with any of the disclosed catalysts in solution reactors ("linear" means that the polyethylene has no or only a few long-chain branches, typically referred to as a g'vis of 0.97 or above, preferably 0.98 or above); and an ethylene polymer having a density of more than 0.940 g/cm$^3$ is referred to as a "high density polyethylene" (HDPE).

As used herein, "core" layer, "outer" layer, and "inner" layer are merely identifiers used for convenience, and shall not be construed as limitation on individual layers, their relative positions, or the laminated structure, unless otherwise specified herein.

As used herein, "first" polyethylene, "second" polyethylene, "third" polyethylene, "fourth" polyethylene, and "fifth" polyethylene are merely identifiers used for convenience, and shall not be construed as limitation on individual polyethylene, their relative order, or the number of polyethylenes used, unless otherwise specified herein.

As used herein, film layers that are the same in composition and in thickness are referred to as "identical" layers.

Polyethylene

In one aspect of the invention, the polyethylene that can be used for the multilayer film described herein are selected from ethylene homopolymers, ethylene copolymers, and compositions thereof. Useful copolymers comprise one or more comonomers in addition to ethylene and can be a random copolymer, a statistical copolymer, a block copolymer, and/or compositions thereof. The method of making the polyethylene is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the polyethylenes are made by the catalysts, activators and processes described in U.S. Pat. Nos. 6,342,566; 6,384,142; and 5,741,563; and WO 03/040201 and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000).

Polyethylenes that are useful in this invention include those sold by ExxonMobil Chemical Company in Houston Tex., including HDPE, LLDPE, and LDPE; and those sold under the ENABLE™, EXACT™, EXCEED™, ESCORENE™, EXXCO™, ESCOR™ PAXON™, and OPTEMA™ tradenames.

Preferred ethylene homopolymers and copolymers useful in this invention typically have one or more of the following properties:

1. an $M_w$ of 20,000 g/mol or more, 20,000 to 2,000,000 g/mol, preferably 30,000 to 1,000,000, preferably 40,000 to 200,000, preferably 50,000 to 750,000, as measured by size exclusion chromatography; and/or 2. a $T_m$ of 30° C. to 150° C., preferably 30° C. to 140° C., preferably 50° C. to 140° C., more preferably 60° C. to 135° C., as determined based on ASTM D3418-03; and/or 3. a crystallinity of 5% to 80%, preferably 10% to 70%, more preferably 20% to 60%, preferably at least 30%, or at least 40%, or at least 50%, as determined based on ASTM D3418-03; and/or 4. a heat of fusion of 300 J/g or less, preferably 1 to 260 J/g, preferably 5 to 240 J/g, preferably 10 to 200 J/g, as determined based on ASTM D3418-03; and/or 5. a crystallization temperature ($T_c$) of 15° C. to 130° C., preferably 20° C. to 120° C., more preferably 25° C. to 110° C., preferably 60° C. to 125° C., as determined based on ASTM D3418-03; and/or 6. a heat deflection temperature of 30° C. to 120° C., preferably 40° C. to 100° C., more preferably 50° C. to 80° C. as measured based on ASTM D648 on injection molded flexure bars, at 66 psi load (455 kPa); and/or 7. a Shore hardness (D scale) of 10 or more, preferably 20 or more, preferably 30 or more, preferably 40 or more, preferably 100 or less, preferably from 25 to 75 (as measured based on ASTM D 2240); and/or 8. a percent amorphous content of at least 50%, preferably at least 60%, preferably at least 70%, more preferably between 50% and 95%, or 70% or less, preferably 60% or less, preferably 50% or less as determined by subtracting the percent crystallinity from 100.

The polyethylene may be an ethylene homopolymer, such as HDPE. In one embodiment, the ethylene homopolymer has a molecular weight distribution ($M_w/M_n$) or (MWD) of up to 40, preferably ranging from 1.5 to 20, or from 1.8 to 10, or from 1.9 to 5, or from 2.0 to 4. In another embodiment, the 1% secant flexural modulus (determined based on ASTM D790A, where test specimen geometry is as specified under the ASTM D790 section "Molding Materials (Thermoplastics and Thermosets)," and the support span is 2 inches (5.08 cm)) of the polyethylene falls in a range of 200 to 1000 MPa, and from 300 to 800 MPa in another embodiment, and from 400 to 750 MPa in yet another embodiment, wherein a desirable polymer may exhibit any combination of any upper flexural modulus limit with any lower flexural modulus limit. The MI of preferred ethylene homopolymers range from 0.05 to 800 dg/min in one embodiment, and from 0.1 to 100 dg/min in another embodiment, as measured based on ASTM D1238 (190° C., 2.16 kg).

In a preferred embodiment, the polyethylene comprises less than 20 mol % propylene units (preferably less than 15 mol %, preferably less than 10 mol %, preferably less than 5 mol %, and preferably 0 mol % propylene units).

In another embodiment of the invention, the polyethylene useful herein is produced by polymerization of ethylene and, optionally, an alpha-olefin with a catalyst having, as a transition metal component, a bis (n-$C_{3-4}$ alkyl cyclopentadienyl) hafnium compound, wherein the transition metal component preferably comprises from about 95 mol % to about 99 mol % of the hafnium compound as further described in U.S. Pat. No. 9,956,088.

In another embodiment of the invention, the polyethylene is an ethylene copolymer, either random or block, of ethylene and one or more comonomers selected from $C_3$ to $C_{20}$ α-olefins, typically from $C_3$ to $C_{10}$ α-olefins. Preferably, the comonomers are present from 0.1 wt % to 50 wt % of the copolymer in one embodiment, and from 0.5 wt % to 30 wt % in another embodiment, and from 1 wt % to 15 wt % in yet another embodiment, and from 0.1 wt % to 5 wt % in yet another embodiment, wherein a desirable copolymer comprises ethylene and $C_3$ to $C_{20}$ α-olefin derived units in any combination of any upper wt % limit with any lower wt % limit described herein. Preferably the ethylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 g/mol in yet another embodiment, wherein a desirable copolymer may comprise any upper molecular weight limit with any lower molecular weight limit described herein.

In another embodiment, the ethylene copolymer comprises ethylene and one or more other monomers selected from the group consisting of $C_3$ to $C_{20}$ linear, branched or cyclic monomers, and in some embodiments is a $C_3$ to $C_{12}$ linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The monomers may be present at up to 50 wt %, preferably from up to 40 wt %, more preferably from 0.5 wt % to 30 wt %, more preferably from 2 wt % to 30 wt %, more preferably from 5 wt % to 20 wt %, based on the total weight of the ethylene copolymer.

Preferred linear alpha-olefins useful as comonomers for the ethylene copolymers useful in this invention include $C_3$ to $C_8$ alpha-olefins, more preferably 1-butene, 1-hexene, and 1-octene, even more preferably 1-hexene. Preferred branched alpha-olefins include 4-methyl-1-pentene, 3-methyl-1-pentene, 3,5,5-trimethyl-1-hexene, and 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly, preferred aromatic monomers include styrene, alpha-methylstyrene, para-alkyl-styrenes, vinyltoluenes, vinylnaphthalene, allyl benzene, and indene, especially styrene, paramethyl styrene, 4-phenyl-1-butene and allyl benzene.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

In a preferred embodiment, one or more dienes are present in the polyethylene at up to 10 wt %, preferably at 0.00001 wt % to 2 wt %, preferably 0.002 wt % to 1 wt %, even more preferably 0.003 wt % to 0.5 wt %, based upon the total weight of the polyethylene. In some embodiments, diene is added to the polymerization in an amount of from an upper limit of 500 ppm, 400 ppm, or 300 ppm to a lower limit of 50 ppm, 100 ppm, or 150 ppm.

Preferred ethylene copolymers useful herein are preferably a copolymer comprising at least 50 wt % ethylene and having up to 50 wt %, preferably 1 wt % to 35 wt %, even more preferably 1 wt % to 6 wt % of a $C_3$ to $C_{20}$ comonomer, preferably a $C_4$ to $C_8$ comonomer, preferably hexene or octene, based upon the weight of the copolymer. Preferably these polymers are metallocene polyethylenes (mPEs).

Useful mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Houston, Tex. under the tradename EXCEED™ Polyethylene or ENABLE™ Polyethylene.

In one preferred embodiment, the multilayer film of the present invention comprises in the core layer a first polyethylene (as a polyethylene defined herein) derived from ethylene and one or more $C_3$ to $C_{20}$ α-olefin comonomers, wherein the first polyethylene has a density of from about 0.900 to about 0.945 g/cm$^3$, a melt index (MI), $I_{2.16}$, of from about 0.1 to about 15 g/10 min, a molecular weight distribution (MWD) of from about 1.5 to about 5.5, and a melt index ratio (MIR), $I_{21.6}/I_{2.16}$, of from about 10 to about 100. In various embodiments, the first polyethylene may have one or more of the following properties:

(a) a density (sample prepared according to ASTM D-4703, and the measurement according to ASTM D-1505) of about 0.910 to 0.945 g/cm$^3$, or about 0.912 to about 0.935 g/cm$^3$;

(b) an MI ($I_{2.16}$, ASTM D-1238, 2.16 kg, 190° C.) of about 0.1 to about 15 g/10 min, or about 0.3 to about 10 g/10 min, or about 0.5 to about 5 g/10 min;

(c) an MIR ($I_{21.6}$ (190° C., 21.6 kg)/$I_{2.16}$ (190° C., 2.16 kg)) of about 10 to about 100, or about 15 to about 80, or about 16 to about 50;

(d) a Composition Distribution Breadth Index ("CDBI") of up to about 85%, or up to about 75%, or about 5 to about 85%, or 10 to 75%. The CDBI may be determined using techniques for isolating individual fractions of a sample of the resin. The preferred technique is Temperature Rising Elution Fraction ("TREF"), as described in Wild, et al., J. Poly. Sci., Poly. Phys. Ed., Vol. 20, p. 441 (1982), which is incorporated herein for purposes of U.S. practice;

(e) an MWD of about 1.5 to about 5.5 (Molecular weight distribution (MWD) is defined to be Mw divided by Mn. The universal calibration method was used for determining the molecular weight distribution (MWD) and molecular-weight averages (i.e., Mn and Mw) of eluting polymer fractions. Thirteen narrow molecular-weight distribution polystyrene standards (obtained from Polymer Labs, UK) within the range of 1.5-8200 kg/mol were used to generate a universal calibration curve. Mark-Houwink parameters were obtained from Appendix I of Mori, S.; Barth, H. G. Size Exclusion Chromatography; Springer, 1999. For polystyrene K=1.38×10−4 dl/g and α=0.7; and for polyethylene K=5.05×10−4 dl/g and α=0.693 were used. For a polymer fraction, which eluted at a temperature step, that has a weight fraction (wt % recovery) of less than 0.5%, the MWD and the molecular-weight averages were not computed; additionally, such polymer fractions were not included in computing the MWD and the molecular-weight averages of aggregates of fractions); and/or (f) a branching index of about 0.9 to about 1.0, or about 0.96 to about 1.0, or about 0.97 to about 1.0. Branching Index is an indication of the amount of branching of the polymer and is defined as $g'=[Rg]^2_{br}/[Rg]^2_{lin}$. "Rg" stands for Radius of Gyration, and is measured using a Waters 150 gel permeation chromatograph equipped with a Multi-Angle Laser Light Scattering ("MALLS") detector, a viscosity detector and a differential refractive index detector. "$[Rg]_{br}$" is the Radius of Gyration for the branched polymer sample and "$[Rg]_{lin}$" is the Radius of Gyration for a linear polymer sample.

The first polyethylene is not limited by any particular method of preparation and may be formed using any process known in the art. For example, the first polyethylene may be formed using gas phase, solution, or slurry processes.

In one embodiment, the first polyethylene is formed in the presence of a metallocene catalyst. For example, the first polyethylene may be an mPE produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. mPEs useful as the first polyethylene include those commercially available from ExxonMobil Chemical Company in Houston, Tex., such as those sold under the trade designation EXCEED™ or ENABLE™.

In accordance with a preferred embodiment, the multilayer film described herein comprises in at least one of the inner layers a second polyethylene, as a polyethylene defined herein, having a density of more than 0.940 g/cm³, preferably about 0.940 g/cm³ to about 0.965 g/cm³. The second polyethylene is typically prepared with either Ziegler-Natta or chromium-based catalysts in slurry reactors, gas phase reactors, or solution reactors. Ethylene polymers useful as the second polyethylene in this invention include those commercially available from ExxonMobil Chemical Company in Houston, Tex., such as HDPE.

In another preferred embodiment, the multilayer film described herein comprises in at least one of the outer layers a third polyethylene (as a polyethylene defined herein) derived from ethylene and one or more $C_3$ to $C_{20}$ α-olefin comonomers, wherein the third polyethylene has a density of about 0.900 to about 0.945 g/cm³, a melt index (MI), $I_{2.16}$, of about 0.1 to about 15 g/10 min, a molecular weight distribution (MWD) of about 1.5 to about 5.5, and a melt index ratio (MIR), $I_{21.6}/I_{2.16}$, of about 10 to about 100. In various embodiments, the third polyethylene may have one or more of the properties or be prepared as defined above for the first polyethylene. The third polyethylene may be the same as or different from the first polyethylene.

In yet another preferred embodiment, at least one of the inner layers of the multilayer film described herein further comprises a fourth polyethylene (as a polyethylene defined herein) having a density of about 0.900 to about 0.945 g/cm³, a melt index (MI), $I_{2.16}$, of about 0.1 to about 15 g/10 min, a molecular weight distribution (MWD) of about 1.5 to about 5.5, and a melt index ratio (MIR), $I_{21.6}/I_{2.16}$, of about 10 to about 100. In various embodiments, the fourth polyethylene may conform to characteristics as set out above for the first polyethylene. The fourth polyethylene may be the same as or different from the first polyethylene.

In yet another preferred embodiment, at least one of the outer layers of the multilayer film described herein further comprises a fifth polyethylene (as a polyethylene defined herein). Preferably, the fifth polyethylene is LDPE. The LDPEs that are useful in the multilayer films described herein are ethylene based polymers produced by free radical initiation at high pressure in a tubular or autoclave reactor as well known in the art. The LDPEs have a medium to broad MWD determined according to the procedure disclosed herein of higher than 4, preferably from 5 to 40, and a high level of long chain branching as well as some short chain branching. The density is generally greater than 0.910 g/cm³ and is preferably from 0.920 to 0.940 g/cm³. The MI may be less than 0.55 or 0.45 g/10 min. In the present invention, the outer layers may contain more than one type of LDPE.

The first polyethylene present in the core layer, the second polyethylene present in at least one of the inner layers, and the third polyethylene present in at least one of the outer layers of the multilayer film described herein may be optionally in a blend with one or more other polymers, such as polyethylenes defined herein, which blend is referred to as polyethylene composition. In particular, the polyethylene compositions described herein may be physical blends or in situ blends of more than one type of polyethylene or compositions of polyethylenes with polymers other than polyethylenes where the polyethylene component is the majority component, e.g., greater than 50 wt % of the total weight of the composition. Preferably, the polyethylene composition is a blend of two polyethylenes with different densities. In a preferred embodiment, the core layer comprises 100 wt % of the first polyethylene, based on total weight of polymer in the core layer. In another preferred embodiment, the second polyethylene is present in an amount of at least about 40 wt %, for example, anywhere between 40 wt %, 45 wt %, 50 wt %, 55 wt %, 60 wt %, 65 wt %, or 70 wt %, and 75 wt %, 80 wt %, 85 wt %, 90 wt %, 95 wt %, or 100 wt %, based on total weight of polymer in the inner layer. In yet another preferred embodiment, the third polyethylene is present in an amount of at least about 90 wt %, for example, about 90 wt %, about 91 wt %, about 92 wt %, about 93 wt %, about 94 wt %, about 95 wt %, about 96 wt %, about 97 wt %, about 98 wt %, about 99 wt %, or about 100 wt %, based on total weight of polymer in the outer layer. In a preferred embodiment where the third polyethylene present in at least one of the outer layers and the fourth polyethylene optionally present in at least one of the inner layers are both the same as the first polyethylene, the first polyethylene can be present in an amount of no more than about 80 wt %, no more than about 70 wt %, no more than about 60 wt %, no more than about 50 wt %, no more than about 40 wt %, no more than about 30 wt %, no more than about 20 wt %, or no more than about 10 wt %, based on total weight of polymer in the multilayer film.

In one embodiment, at least one of the inner layers of the multilayer film described herein has a density within about 0.065 g/cm³ higher than or equal to that of the core layer, and about 0.015 to about 0.065 g/cm³ higher than that of the outer layer on the same side of the core layer; wherein the core layer has a density no lower than that of each of the outer layers. Preferably, at least one of the inner layers has a density of about 0.915 to about 0.965 g/cm$^3$.

It has been surprisingly discovered that use of the inventive film design of at least five layers as described herein to split the functionality of the core layer in the traditional three-layer film structure can provide well-tailored film properties favored by a particular application while optimizing balance between properties repulsive to each other. Especially, as long as a multilayer film is prepared with density relationship between layers as described above, stiffness-related and toughness-related properties can be respectively highlighted by adjusting position and thickness of the layer having highest density of all layers, i.e. the inner layer as described herein, in opposite design directions to suit different end purposes. Specifically, stiffness-related properties, including bending stiffness and tensile properties, can be enhanced by moving the inner layers away from the central axis of the film gauge and/or increasing thickness of the inner layer while toughness-related properties, including tear resistance and dart impact, the other way around. In addition, a better-compromised balance between stiffness-related and toughness-related properties and between mechanical and optical properties can also be achieved, leading to improved overall film performance optionally with a gauge reduction of at least about 10%. In other words, by virtue of the inner layers absent in the conventional three-layer structure, desired film property profile and balanced overall film performance can be simultaneously satisfied in a more convenient and more flexible way with the inventive film described herein than with the conventional three-layer film without changing the polyethylenes used.

Film Structures

The multilayer film of the present invention may further comprise additional layer(s), which may be any layer typically included in multilayer film constructions. For example, the additional layer(s) may be made from:

1. Polyolefins. Preferred polyolefins include homopolymers or copolymers of $C_2$ to $C_{40}$ olefins, preferably $C_2$ to $C_{20}$ olefins, preferably a copolymer of an α-olefin and another olefin or α-olefin (ethylene is defined to be an α-olefin for purposes of this invention). Preferably homopolyethylene, homopolypropylene, propylene copolymerized with ethylene and/or butene, ethylene copolymerized with one or more of propylene, butene or hexene, and optional dienes. Preferred examples include thermoplastic polymers such as ultra-low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and compositions of thermoplastic polymers and elastomers, such as, for example, thermoplastic elastomers and rubber toughened plastics.

2. Polar polymers. Preferred polar polymers include homopolymers and copolymers of esters, amides, acetates, anhydrides, copolymers of a $C_2$ to $C_{20}$ olefin, such as ethylene and/or propylene and/or butene with one or more polar monomers, such as acetates, anhydrides, esters, alcohol, and/or acrylics. Preferred examples include polyesters, polyamides, ethylene vinyl acetate copolymers, and polyvinyl chloride.

3. Cationic polymers. Preferred cationic polymers include polymers or copolymers of geminally disubstituted olefins, α-heteroatom olefins and/or styrenic monomers. Preferred geminally disubstituted olefins include isobutylene, isopentene, isoheptene, isohexane, isooctene, isodecene, and isododecene. Preferred α-heteroatom olefins include vinyl ether and vinyl carbazole, preferred styrenic monomers include styrene, alkyl styrene, para-alkyl styrene, α-methyl styrene, chloro-styrene, and bromo-para-methyl styrene. Preferred examples of cationic polymers include butyl rubber, isobutylene copolymerized with para methyl styrene, polystyrene, and poly-α-methyl styrene.

4. Miscellaneous. Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbond fibers, and nonwovens (particularly polypropylene spunbond fibers or nonwovens), and substrates coated with inks, dyes, pigments, and the like.

In particular, a multilayer film can also include layers comprising materials such as ethylene vinyl alcohol (EVOH), polyamide (PA), polyvinylidene chloride (PVDC), or aluminium, so as to obtain barrier performance for the film where appropriate.

In one aspect of the invention, the multilayer film described herein may be produced in a stiff oriented form (often referred to as "pre-stretched" by persons skilled in the art) and may be useful for laminating to inelastic materials, such as polyethylene films, biaxially oriented polyester (e.g., polyethylene terephthalate (PET)) films, biaxially oriented polypropylene (BOPP) films, biaxially oriented polyamide (nylon) films, foil, paper, board, or fabric substrates, or may further comprise one of the above substrate films to form a laminate structure.

The thickness of the multilayer films may range from 15 to 250 μm in general and is mainly determined by the intended use and properties of the film. Stretch films may be thin; those for shrink films or heavy duty bags are much thicker. Conveniently the film has a thickness of from 15 to 250 μm, preferably from 20 to 150 μm, more preferably from 25 to 100 μm, or even more preferably 30 to 60 μm. The total thickness of the two outer layers may be at most about 60%, for example, about 10%, about 20%, about 30%, about 40%, about 50%, about 60%, or in the range of any combinations of the values recited herein, of the total thickness of the multilayer film. The total thickness of the two inner layers may be at most about two thirds, for example, about one tenth, about one fifth, about one third, about two fifths, about half, about three fifths, about two thirds, or in the range of any combinations of the values recited herein, of the total thickness of the multilayer film.

The multilayer film described herein may have an A/B/X/B/A structure wherein A are outer layers and X represents the core layer and B are inner layers between the core layer and each outer layer. The composition of the A layers may be the same or different, but conform to the limitations set out herein. Preferably, the two A layers are identical. The composition of the B layers may also be the same or different, but conform to the limitations set out herein. Preferably, the two B layers are identical. At least one of the B layers has a density within about 0.065 g/cm$^3$ higher than or equal to that of the X layer, and about 0.015 to about 0.065 g/cm$^3$ higher than that of the A layer on the same side of the core layer. The X layer has a density no lower than that of each of the A layers.

In a preferred embodiment, the multilayer film has a five-layer A/B/X/B/A structure, comprising two outer layers, a core layer between the two outer layers, and two inner layers each between the core layer and each outer layer, wherein each of the inner layers has a density within about 0.065 g/cm$^3$ higher than or equal to that of the core layer, and about 0.015 to about 0.065 g/cm$^3$ higher than that of the outer layer on the same side of the core layer; wherein the core layer has a density no lower than that of each of the outer layers; wherein (a) the core layer comprises 100 wt % of a first polyethylene derived from ethylene and one or more C$_3$ to C$_{20}$ α-olefin comonomers, based on total weight of polymer in the core layer, wherein the first polyethylene has a density of about 0.900 to about 0.945 g/cm$^3$, a melt index (MI), I$_{2.16}$, of about 0.1 to about 15, a molecular weight distribution (MWD) of about 1.5 to about 5.5, and a melt index ratio (MIR), I$_{21.6}$/I$_{2.16}$, of about 10 to about 25; (b) each of the inner layers comprises at least about 40 wt % of a second polyethylene having a density of more than 0.940 g/cm$^3$, based on total weight of polymer in each of the inner layers; (c) each of the outer layers comprises at least about 90 wt % of the first polyethylene, based on total weight of polymer in each of the two outer layers. Preferably, the five-layer film has a thickness of about 45 to 50 μm. Preferably, the two outer layers have in a total thickness of at most about 60% of the total thickness of the five-layer film and the two inner layers have a total thickness of at most about two thirds of the total thickness of the five-layer film.

Film Properties and Applications

The multilayer films of the present invention may be adapted to form flexible packaging films for a wide variety of applications, such as, cling film, low stretch film, non-stretch wrapping film, pallet shrink, over-wrap, agricultural, collation shrink film and laminated films, including stand-up pouches. The film structures that may be used for bags are prepared such as sacks, trash bags and liners, industrial liners, produce bags, and heavy duty bags. The bags may be made on vertical or horizontal form, fill and seal equipment. The film may be used in flexible packaging, food packaging, e.g., fresh cut produce packaging, frozen food packaging, bundling, packaging and unitizing a variety of products. A package comprising a multilayer film described herein can be heat sealed around package content.

The multilayer film described herein or made according to any method disclosed herein may have at least one of the following properties: (i) a bending stiffness factor of at most about 50% higher; (ii) a tear resistance of at most about 15% higher in MD; and (iii) a dart impact of at most about 40% higher; compared to that of a three-layer film having two outer layers and a core layer between the two outer layers, the same total thickness as that of the multilayer film, the same composition of each of the two outer layers as that of the multilayer film, maximum thickness of the core layer equal to total thickness of the two inner layers and the core layer of the multilayer film, and maximum density of the core layer equal to compound density of the two inner layers and the core layer of the multilayer film. Preferably, the multilayer film may further have at least one of the following properties: (i) a 1% Secant Modulus of at most about 30% higher in MD and of at most about 30% higher in Transverse Direction (TD); (ii) a 10% offset yield stress of at most about 15% higher in MD; (iii) a yield stress of at most about 20% higher in TD; and (iv) a gloss of at most about 15% higher, compared to that of a three-layer film having two outer layers and a core layer between the two outer layers, the same total thickness as that of the multilayer film, the same composition of each of the two outer layers as that of the multilayer film, maximum thickness of the core layer equal to total thickness of the two inner layers and the core layer of the multilayer film, and maximum density of the core layer equal to compound density of the two inner layers and the core layer of the multilayer film.

With the present invention, by modifying position and thickness of the inner layers described herein at density relationship between layers as set out herein, the long-standing difficulty in emphasizing application-oriented properties while maximizing overall film performance achievable of a three-layer film without increasing polyethylene consumption can be addressed.

Methods for Making the Multilayer Film

Also provided are methods for making multilayer films of the present invention. A method for making a multilayer film may comprise the steps of: (a) preparing two outer layers, a core layer between the two outer layers, and two inner layers each between the core layer and each outer layer, wherein at least one of the inner layers has a density within about 0.065 g/cm$^3$ higher than or equal to that of the core layer, and about 0.015 to about 0.065 g/cm$^3$ higher than that of the outer layer on the same side of the core layer; wherein the core layer has a density no lower than that of each of the outer layers; and (b) forming a multilayer film comprising the layers in step (a); wherein the multilayer film has at least one of the following properties: (i) a bending stiffness factor of at most about 50% higher; (ii) a tear resistance of at most about 15% higher in MD; and (iii) a dart impact of at most about 40% higher; compared to that of a three-layer film having two outer layers and a core layer between the two outer layers, the same total thickness as that of the multilayer film, the same composition of each of the two outer layers as that of the multilayer film, maximum thickness of the core layer equal to total thickness of the two inner layers and the core layer of the multilayer film, and maximum density of the core layer equal to compound density of the two inner layers and the core layer of the multilayer film.

The multilayer films described herein may be formed by any of the conventional techniques known in the art including blown extrusion, cast extrusion, coextrusion, blow molding, casting, and extrusion blow molding.

In one embodiment of the invention, the multilayer films of the present invention may be formed by using blown techniques, i.e., to form a blown film. For example, the composition described herein can be extruded in a molten state through an annular die and then blown and cooled to form a tubular, blown film, which can then be axially slit and unfolded to form a flat film. As a specific example, blown films can be prepared as follows. The polymer composition is introduced into the feed hopper of an extruder, such as a 50 mm extruder that is water-cooled, resistance heated, and has an L/D ratio of 30:1. The film can be produced using a 28 cm W&H die with a 1.4 mm die gap, along with a W&H dual air ring and internal bubble cooling. The film is extruded through the die into a film cooled by blowing air onto the surface of the film. The film is drawn from the die typically forming a cylindrical film that is cooled, collapsed and, optionally, subjected to a desired auxiliary process, such as slitting, treating, sealing, or printing. Typical melt temperatures are from about 180° C. to about 230° C. Blown film rates are generally from about 3 to about 25 kilograms per hour per inch (about 4.35 to about 26.11 kilograms per hour per centimeter) of die circumference. The finished film can be wound into rolls for later processing. A particular blown film process and apparatus suitable for forming films according to embodiments of the present invention is described in U.S. Pat. No. 5,569,693. Of course, other blown film forming methods can also be used.

The compositions prepared as described herein are also suited for the manufacture of blown film in a high-stalk extrusion process. In this process, a polyethylene melt is fed through a gap (typically 0.5 to 1.6 mm) in an annular die attached to an extruder and forms a tube of molten polymer which is moved vertically upward. The initial diameter of the molten tube is approximately the same as that of the annular die. Pressurized air is fed to the interior of the tube to maintain a constant air volume inside the bubble. This air pressure results in a rapid 3-to-9-fold increase of the tube diameter which occurs at a height of approximately 5 to 10 times the die diameter above the exit point of the tube from the die. The increase in the tube diameter is accompanied by a reduction of its wall thickness to a final value ranging from approximately 10 to 50 μm and by a development of biaxial orientation in the melt. The expanded molten tube is rapidly cooled (which induces crystallization of the polymer), collapsed between a pair of nip rolls and wound onto a film roll.

In blown film extrusion, the film may be pulled upwards by, for example, pinch rollers after exiting from the die and is simultaneously inflated and stretched transversely sideways to an extent that can be quantified by the blow up ratio (BUR). The inflation provides TD stretch, while the upwards pull by the pinch rollers provides MD stretch. As the polymer cools after exiting the die and inflation, it crystallizes and a point is reached where crystallization in the film is sufficient to prevent further MD or TD orientation. The location at which further MD or TD orientation stops is generally referred to as the "frost line" because of the development of haze at that location.

Variables in this process that determine the ultimate film properties include the die gap, the BUR and TD stretch, the take up speed and MD stretch and the frost line height. Certain factors tend to limit production speed and are largely determined by the polymer rheology including the shear sensitivity which determines the maximum output and the melt tension which limits the bubble stability, BUR and take up speed.

A laminate structure with the inventive multilayer film prepared as described herein can be formed by lamination to a substrate film using any process known in the art, including solvent based adhesive lamination, solvent less adhesive lamination, extrusion lamination, heat lamination, etc.

EXAMPLES

The present invention, while not meant to be limited by, may be better understood by reference to the following examples and tables.

Example 1

A batch of ten inventive film samples (Samples 1-10) of 50 μm with an A/B/X/B/A structure were prepared on a W&H coextrusion blown film line with a BUR of 2.5. Each of the samples comprises (a) 100 wt % of EXCEED™ 1018HA mPE resin (density: 0.918 g/cm$^3$, MI: 1.0 g/10 min) (ExxonMobil Chemical Company, Houston, Tex., USA) in the core layer, based on total weight of polymer in the core layer; (b) 100 wt % of ExxonMobil™ HDPE HTA 108 resin (density: 0.961 g/cm$^3$) (ExxonMobil Chemical Company, Houston, Tex., USA) in each of the inner layers, based on total weight of polymer in the inner layer; and (c) 100 wt % of EXCEED™ 1018 KB mPE resin (density: 0.918 g/cm$^3$, MI: 1.0 g/10 min) (ExxonMobil Chemical Company, Houston, Tex., USA) in each of the outer layers, based on total weight of polymer in the outer layer. Layer distribution (% relative to the total thickness of the film sample) of each samples are listed below in Table 1. Properties including bending stiffness, Elmendorf tear strength, dart impact, 1% Secant Modulus, 10% offset yield stress, yield stress, and gloss, were measured for all samples.

TABLE 1

Layer distribution (%) of film samples in Example 1

| Sample No. | Thickness (%) | | |
|---|---|---|---|
| | Outer | Inner | Core |
| 1 | 7 | 22 | 43 |
| 2 | 30 | 10 | 20 |
| 3 | 7 | 10 | 66 |
| 4 | 7 | 33 | 20 |
| 5 | 19 | 10 | 43 |
| 6 | 19 | 21 | 20 |
| 7 | 11 | 25 | 27 |
| 8 | 23 | 14 | 28 |
| 9 | 11 | 14 | 50 |
| 10 | 15 | 18 | 35 |

Bending stiffness, as an indicator for stiffness of the material and its thickness, is the resistance against flexure and was measured by a method referred to as "two point bending method" based on DIN 53121 using a Zwick two point bending equipment mounted on the cross-head in a Zwick 1445 tensile tester. The sample is vertically clamped at one end while the force is applied to the free end of the sample normal to its plane (two point bending). The sample is fixed in an upper clamping unit while the free end pushes (upon flexure) against a thin probe (lamella) connected to a sensitive load cell capable of measuring small load values. The bending stiffness factor is defined as the moment of resistance per unit width that the film offers to bending, which can be seen as a width related flexural strength and is expressed in mN·mm.

Elmendorf tear strength was measured in MD based on ASTM D1922-06a using the Tear Tester 83-11-01 from TMI Group of Companies and measures the energy required to continue a pre-cut tear in the test sample, presented as tearing force in gram. Samples were cut across the web using the constant radius tear die and were free of any visible defects (e.g., die lines, gels, etc.).

Dart impact was measured by a method following ASTM D1709 on a Dart Impact Tester Model C from Davenport Lloyd Instruments in which a pneumatically operated annular clamp is used to obtain a uniform flat specimen and the dart is automatically released by an electro-magnet as soon a sufficient air pressure is reached on the annular clamp. A dart with a 38.10±0.13 mm diameter hemispherical head dropped from a height of 0.66±0.01 m was employed. Dart impact measures the energy causing a film to fail under specified conditions of impact of a freely-falling dart. This energy is expressed in terms of the weight (mass, g) of the dart falling from a specified height, which would result in 50% failure of tested samples. Samples have a minimum width of 20 cm and a recommended length of 10 m. Samples are generally free of pinholes, wrinkles, folds or other apparent defects, unless such defects constitute variables by request.

Tensile properties of the films were measured by a method which is based on ASTM D882 with static weighing and a constant rate of grip separation using a Zwick 1445 tensile tester with a 200N. Since rectangular shaped test samples were used, no additional extensometer was used to measure extension. The nominal width of the tested film sample is 15 mm and the initial distance between the grips is 50 mm A pre-load of 0.1N was used to compensate for the so called TOE region at the origin of the stress-strain curve. The constant rate of separation of the grips is 5 mm/min upon reaching the pre-load, 5 mm/min to measure 1% Secant modulus (up to 1% strain), and 500 mm/min to measure yield point and 10% offset yield stress. The film samples may be tested in MD and TD.

1% Secant modulus is calculated by drawing a tangent through two well defined points on the stress-strain curve. The reported value corresponds to the stress at 1% strain (with x correction). The result is expressed as load per unit area (N/mm). The value is an indication of the film stiffness in tension. The 1% secant modulus is used for thin film and sheets as no clear proportionality of stress to strain exists in the initial part of the curve.

The yield point is defined as the first point on the stress-strain curve at which an increase in strain occurs without an increase in stress. In some cases a true yield point can be found on the stress-elongation diagram where the stress reaches a maximum. This indicates that the stress declines when the film is elongated beyond the yield point. Yield stress is the stress at the yield point and expressed in N. For some PE film samples (especially in MD) no true maximum appears. The stress necessary for further elongation increases; but at a slower rate. The stress elongation curve shows a shoulder before reaching a so-called plateau region where the film sample can be elongated at low additional stress. In such a case the offset yield point is determined. In the description the 10% offset yield stress is the stress in N at the 10% offset yield point expressed as the intersection point between the stress-elongation curve and the line at 10% offset (parallel line to the tangent to the initial straight proportional portion of the stress-elongation curve). When a true distinctive yield point can be detected preferably this should be reported first, in this case the offset yield can also be calculated and reported. When no true yield point can be detected, only the 10% offset yield point is calculated and determined. Linear polyethylenes generally do not have a true yield point and can be elongated significantly with low additional stress.

Gloss was measured based on ASTM D-2457 using a gloss meter Micro Gloss 45 from BYK Gardner. A light source is beamed onto the plastic surface at an angle of 45° and the amount of light reflected is measured as a Gloss Unit (GU) value. The higher the gloss value is, the shinier the plastic is.

Samples were conditioned at 23° C.±2° C. and 50%±10% relative humidity for at least 40 hours prior to determination of all properties. Maximum and minimum values of test results for the samples are shown in Table 2.

TABLE 2

Maximum and minimum values of properties of film samples in Example 1

| Property | Max | min |
|---|---|---|
| Bending Stiffness (mN.mm) | 6.4 | 3.2 |
| Elmendorf tear MD (gram) | 523 | 79 |
| Dart Impact (g) | 350 | 165 |
| 1% Secant Modulus MD (N/mm) | 11.2 | 5.8 |
| 1% Secant Modulus TD (N/mm) | 13.2 | 5.9 |
| 10% Offset Yield Stress MD (N) | 16.4 | 10.6 |
| Yield Stress (TD) | 18.8 | 10.9 |
| Gloss 45° (GU) | 81 | 70 |

Example 2

Out of Samples 1-10 in Example 1, Sample 2 having inner layers thinnest and closest to the central axis of the film gauge and Sample 4 having inner layers thickest and farthest from the central axis of the film gauge were selected to compare properties with comparative three-layer samples (Samples 2a, 2b, 4a, and 4b). Samples 2a, 2b, 4a, and 4b, provided as control, of the same thickness of 50 μm as that of the inventive samples were prepared with two outer layers and a core layer between the two outer layers, having a thickness ratio of 1:4 (Samples 2a and 4a) and 1:8 (Samples 2b and 4b), respectively, between each of the outer layers and the core layer. Each of the comparative samples comprises: (a) ExxonMobil™ HDPE HTA 108 resin (density: 0.961 g/cm$^3$) (ExxonMobil Chemical Company, Houston, Tex., USA) in the core layer, wherein the ExxonMobil™ HDPE HTA 108 resin is present in an amount equal or comparable to that present in the inventive counterpart (i.e. Sample 2 being counterpart of Samples 2a and 2b and Sample 4 being counterpart of Samples 4a and 4b); and (b) 100 wt % of EXCEED™ 1018 KB mPE resin (density: 0.918 g/cm$^3$, MI: 1.0 g/10 min) (ExxonMobil Chemical Company, Houston, Tex., USA) in each of the outer layers, based on total weight of polymer in the outer layer. Structure-wise formulations (based on total weight of polymer in the layer), layer distribution and total content of polyethylenes (based on total weight of polymer in the film sample) of Samples 2, 2a, 2b, 4, 4a, and 4b are shown below in Table 3. Properties were respectively measured for all samples by methods as previously described herein and test results are shown in Table 4.

TABLE 3

Structure-wise formulations (wt %), layer distribution and total content of polyethylenes (wt %) for film samples in Example 2

| Sample No. | Layer Distribution | Outer | Inner | Core | Total HDPE | Total mPE |
|---|---|---|---|---|---|---|
| 2 | 30/10/20/10/30 | EXCEED ™ 1018KB (100) | ExxonMobil ™ HDPE HTA 108 (100) | EXCEED ™ 1018HA (100) | 20 | 80 |
| 2a | 1/4/1 | EXCEED ™ 1018KB (100) | — | ExxonMobil ™ HDPE HTA 108 (27) EXCEED ™ 1018HA (73) | 18 | 82 |
| 2b | 1/8/1 | EXCEED ™ 1018KB (100) | — | ExxonMobil ™ HDPE HTA 108 (23) EXCEED ™ 1018HA (77) | 18 | 82 |

TABLE 3-continued

Structure-wise formulations (wt %), layer distribution and total content of polyethylenes (wt %) for film samples in Example 2

| Sample No. | Layer Distribution | Outer | Inner | Core | Total HDPE | Total mPE |
|---|---|---|---|---|---|---|
| 4 | 7/33/20/33/7 | EXCEED™ 1018KB (100) | ExxonMobil™ HDPE HTA 108 (100) | EXCEED™ 1018HA (100) | 66 | 34 |
| 4a | 1/4/1 | EXCEED™ 1018KB (100) | — | ExxonMobil™ HDPE HTA 108 (100) | 66 | 34 |
| 4b | 1/8/1 | EXCEED™ 1018KB (100) | — | ExxonMobil™ HDPE HTA 108 (83) EXCEED™ 1018HA (17) | 66 | 34 |

TABLE 4

Properties of film samples in Example 2

| | Sample No. | | | | | |
|---|---|---|---|---|---|---|
| Property | 2 | 2a | 2b | 4 | 4a | 4b |
| Bending Stiffness (mN · mm) | 3.2 | 2.2 | 2.2 | 6.0 | 4.1 | 4.4 |
| Elmendorf tear MD (gram) | 522 | 625 | 630 | 79 | 69 | 75 |
| Dart Impact (g) | 308 | 533 | 520 | 165 | 118 | 124 |
| 1% Secant Modulus MD (N/mm) | 5.8 | 4.6 | 4.8 | 11.2 | 11.7 | 11.1 |
| 1% Secant Modulus TD (N/mm) | 6.0 | 4.7 | 4.7 | 13.2 | 14.0 | 12.4 |
| 10% Offset Yield Stress MD (N) | 11.0 | 9.5 | 9.7 | 16.4 | 16.7 | 16.4 |
| Yield Stress TD (N) | 11.4 | 9.8 | 9.8 | 18.8 | 19.4 | 18.4 |
| Gloss 45° (GU) | 78 | 80 | 80 | 70 | 67 | 68 |

As shown in Table 4, at given total thickness and total amounts of polyethylenes, the inventive five-layer structure featuring density relationship between layers described herein can strengthen stiffness-related properties, as demonstrated by bending stiffness, 1% Secant Modulus, 10% offset yield stress, and yield stress, by thickening and/or moving inner layers away from the central axis of the film gauge as represented by thicker core layer and inner layers of Sample 4, and highlight toughness-related properties, as demonstrated by Elmendorf tear and dart impact, by slimming and/or moving inner layers towards the central axis of the film gauge as represented by thicker outer layers and thinner inner layers of Sample 2. Furthermore, the inventive five-layer samples outperformed their respective comparative three-layer counterparts in terms of overall film performance with a better-compromised balance between properties repulsive to each other.

Particularly, without being bound by theory, it is believed that the inner layers in the inventive multilayer film playing the role of splitting the functionality of the core layer in the conventional three-layer structure can aid in meeting application-oriented property profile requirements in a more convenient and more flexible manner than the conventional three-layer structure using the same types and amounts of polymers with a well-balanced overall film performance. As a result, the present invention can serve as an efficient and cost-effective alternative to the current film solutions over a broad range of end-uses.

Example 3

Another inventive sample (Sample 4') was prepared by down-gauging Sample 4 in Example 1 to 45 μm while keeping otherwise identical with Sample 4. Properties were respectively measured for Sample 4' by methods as previously described herein and test results are listed in Table 5 in comparison with those for Sample 4 and values in Table 2.

TABLE 5

Properties of Sample 4' in comparison with Sample 4 and maximum and minimum values for film samples in Example 1

| | Sample No. | | | |
|---|---|---|---|---|
| Property | 4' | 4 | Max | min |
| Bending Stiffness (mN.mm) | 4.0 | 6.0 | 6.4 | 3.2 |
| Elmendorf tear MD (gram) | 72 | 79 | 523 | 79 |
| Dart Impact (g) | 165 | 165 | 350 | 165 |
| 1% Secant Modulus MD (N/mm) | 10.2 | 11.2 | 11.2 | 5.8 |
| 1% Secant Modulus TD (N/mm) | 11.9 | 13.2 | 13.2 | 5.9 |
| 10% Offset Yield Stress MD (N) | 14.8 | 16.4 | 16.4 | 10.6 |
| Yield Stress (TD) | 16.8 | 18.8 | 18.8 | 10.9 |
| Gloss 45° (GU) | 70 | 70 | 81 | 70 |

It can been seen from Table 5 that properties of the inventive Sample 4' were generally maintained at a level comparable to those of Sample 4 and basically fall within the range formed by the maximum and minimum values obtained with the group of the inventive samples, indicating an at least 10% down-gauging potential of the inventive multilayer film without significantly compromising property profile and overall performance.

All documents described herein are incorporated by reference herein, including any priority documents and/or testing procedures. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A multilayer film, comprising two outer layers, a core layer between the two outer layers, and two inner layers each between the core layer and each outer layer, wherein at least one of the inner layers has a density within about 0.065 g/cm$^3$ higher than or equal to that of the core layer, and about 0.015 to about 0.065 g/cm$^3$ higher than that of the outer layer on the same side of the core layer; wherein the core layer has a density no lower than that of each of the outer layers;

wherein the core layer comprises a first polyethylene derived from ethylene and one or more C$_3$ to C$_{20}$ α-olefin comonomers, wherein the first polyethylene has a density of from about 0.900 to about 0.945 g/cm$^3$, a melt index (MI), I$_{2.16}$, of from about 0.1 to about 15 g/10 min, a molecular weight distribution (MWD) of from about 1.5 to about 5.5, and a melt index ratio (MIR), I$_{21.6}$/I$_{2.16}$, of from about 10 to about 100; and wherein the multilayer film has at least one of the following properties: (i) a bending stiffness factor of at most about 50% higher; (ii) a tear resistance of at most about 15% higher in the Machine Direction (MD); and (iii) a dart impact of at most about 40% higher, each as compared to that of a comparative three-layer film having two outer layers and a core layer between the two outer layers, the same total thickness as that of the multilayer film, the same composition of each of the two outer layers as that of the multilayer film, a maximum thickness of the core layer equal to a total thickness of the two inner layers and the core layer of the multilayer film, and a maximum density of the core layer equal to compound density of the two inner layers and the core layer of the multilayer film.

2. The multilayer film of claim 1, wherein the multilayer film further has at least one of the following properties: (i) a 1% Secant Modulus of at most about 30% higher in MD and of at most about 30% higher in Transverse Direction (TD); (ii) a 10% offset yield stress of at most about 15% higher in MD; (iii) a yield stress of at most about 20% higher in TD; and (iv) a gloss of at most about 15% higher, each as compared to that of the comparative three-layer film.

3. The multilayer film of claim 1, wherein at least one of the inner layers has a density of about 0.915 to about 0.965 g/cm$^3$.

4. The multilayer film of claim 1, wherein the first polyethylene is present in an amount of 100 wt %, based on total weight of polymer in the core layer.

5. The multilayer film of claim 1, wherein at least one of the inner layers comprises a second polyethylene having a density of at least about 0.940 g/cm$^3$.

6. The multilayer film of claim 5, wherein the second polyethylene is present in an amount of at least about 40 wt %, based on total weight of polymer in the inner layer.

7. The multilayer film of claim 1, wherein at least one of the inner layers further comprises a fourth polyethylene.

8. The multilayer film of claim 7, wherein the fourth polyethylene has a density of about 0.900 to about 0.945 g/cm$^3$, a melt index (MI), I$_{2.16}$, of about 0.1 to about 15 g/10 min, a molecular weight distribution (MWD) of about 1.5 to about 5.5, and a melt index ratio (MIR), I$_{21.6}$/I$_{2.16}$, of about 10 to about 100.

9. The multilayer film of claim 1, wherein at least one of the outer layers further comprises a fifth polyethylene.

10. The multilayer film of claim 9, wherein the fifth polyethylene is LDPE.

11. The multilayer film of claim 1, wherein the two outer layers have a total thickness of at most about 60% of the total thickness of the multilayer film.

12. The multilayer film of claim 1, wherein the two outer layers are identical.

13. The multilayer film of claim 1, wherein the two inner layers have a total thickness of at most about two thirds of the total thickness of the multilayer film.

14. The multilayer film of claim 1, wherein the two inner layers are identical.

15. The multilayer film of claim 1, wherein the multilayer film has a total thickness of about 15 to about 250 μm.

16. The multilayer film of claim 1, wherein the multilayer film has five layers.

17. A multilayer film, comprising two outer layers, a core layer between the two outer layers, and two inner layers each between the core layer and each outer layer, wherein at least one of the inner layers has a density within about 0.065 g/cm$^3$ higher than or equal to that of the core layer, and about 0.015 to about 0.065 g/cm$^3$ higher than that of the outer layer on the same side of the core layer; wherein the core layer has a density no lower than that of each of the outer layers;

wherein at least one of the outer layers comprises a polyethylene derived from ethylene and one or more C$_3$ to C$_{20}$ α-olefin comonomers, wherein the polyethylene has a density of about 0.900 to about 0.945 g/cm$^3$, a melt index (MI), I$_{2.16}$, of about 0.1 to about 15 g/10 min, a molecular weight distribution (MWD) of about 1.5 to about 5.5, and a melt index ratio (MIR), I$_{21.6}$/I$_{2.16}$, of about 10 to about 100; and wherein the multilayer film has at least one of the following properties: (i) a bending stiffness factor of at most about 50% higher; (ii) a tear resistance of at most about 15% higher in the Machine Direction (MD); and (iii) a dart impact of at most about 40% higher, each as compared to that of a comparative three-layer film having two outer layers and a core layer between the two outer layers, the same total thickness as that of the multilayer film, the same composition of each of the two outer layers as that of the multilayer film, a maximum thickness of the core layer equal to a total thickness of the two inner layers and the core layer of the multilayer film, and a maximum density of the core layer equal to compound density of the two inner layers and the core layer of the multilayer film.

18. The multilayer film of claim 17, wherein the polyethylene is present in an amount of at least about 90 wt %, based on total weight of polymer in the outer layer.

19. A five-layer film, comprising two outer layers, a core layer between the two outer layers, and two inner layers each between the core layer and each outer layer, wherein each of the inner layers has a density within about 0.065 g/cm$^3$ higher than or equal to that of the core layer, and about 0.015 to about 0.065 g/cm$^3$ higher than that of the outer layer on the same side of the core layer; wherein the core layer has a density no lower than that of each of the outer layers;

wherein (a) the core layer comprises 100 wt % of a first polyethylene derived from ethylene and one or more C$_3$ to C$_{20}$ α-olefin comonomers, based on total weight of polymer in the core layer, wherein the first polyethylene has a density of about 0.900 to about 0.945 g/cm$^3$, a melt index (MI), I$_{2.16}$, of about 0.1 to about 15, a molecular weight distribution (MWD) of about 1.5 to about 5.5, and a melt index ratio (MIR), I$_{21.6}$/I$_{2.16}$, of about 10 to about 25;

(b) each of the inner layers comprises at least about 40 wt % of a second polyethylene having a density of more than 0.940 g/cm$^3$, based on total weight of polymer in each of the inner layers;

(c) each of the outer layers comprises at least about 90 wt % of the first polyethylene, based on total weight of polymer in each of the two outer layers;

wherein the five-layer film has at least one of the following properties: (i) a bending stiffness factor of at most about 50% higher; (ii) a tear resistance of at most about 15% higher in MD; and (iii) a dart impact of at most about 40% higher, each as compared to that of a comparative three-layer film having two outer layers and a core layer between the two outer layers, the same total thickness as that of the five-layer film, the same composition of each of the two outer layers as that of the five-layer film, a maximum thickness of the core layer equal to a total thickness of the two inner layers and the core layer of the five-layer film, and a maximum density of the core layer equal to compound density of the two inner layers and the core layer of the five-layer film.

20. The five-layer film of claim 19, wherein the five-layer film further has at least one of the following properties: (i) a 1% Secant Modulus of at most about 30% higher in MD and of at most about 30% higher in TD; (ii) a 10% offset yield stress of at most about 15% higher in MD; (iii) a yield stress of at most about 20% higher in TD; and (iv) a gloss of at most about 15% higher, each as compared to that of the comparative three-layer film.

21. The five-layer film of claim 19, wherein the five-layer film has a thickness of about 45 to 50 µm.

22. The five-layer film of claim 19, wherein the two outer layers have a total thickness of at most about 60% of the total thickness of the five-layer film and the two inner layers have a total thickness of at most about two thirds of the total thickness of the five-layer film.

23. A method for making a multilayer film, comprising the steps of:

(a) preparing two outer layers, a core layer between the two outer layers, and two inner layers each between the core layer and each outer layer, wherein at least one of the inner layers has a density within about 0.065 g/cm$^3$ higher than or equal to that of the core layer, and about 0.015 to about 0.065 g/cm$^3$ higher than that of the outer layer on the same side of the core layer; wherein the core layer has a density no lower than that of each of the outer layers; and (b) forming a multilayer film comprising the layers in step (a);

wherein the multilayer film has at least one of the following properties: (i) a bending stiffness factor of at most about 50% higher; (ii) a tear resistance of at most about 15% higher in MD; and (iii) a dart impact of at most about 40% higher, each as compared to that of a comparative three-layer film having two outer layers and a core layer between the two outer layers, the same total thickness as that of the multilayer film, the same composition of each of the two outer layers as that of the multilayer film, a maximum thickness of the core layer equal to a total thickness of the two inner layers and the core layer of the multilayer film, and a maximum density of the core layer equal to compound density of the two inner layers and the core layer of the multilayer film.

24. The method of claim 23, wherein the multilayer film in step (b) is formed by blown extrusion, cast extrusion, co-extrusion, blow molding, casting, or extrusion blow molding.

* * * * *